(12) United States Patent
Cha et al.

(10) Patent No.: US 10,521,293 B2
(45) Date of Patent: Dec. 31, 2019

(54) MEMORY DEVICE FOR PERFORMING PARALLEL READ-MODIFY-WRITE OPERATION

(71) Applicant: Samsung Electronics Co., Ltd., Suwon-si, Gyeonggi-do (KR)

(72) Inventors: Sang-uhn Cha, Yongin-si (KR); In-woo Jun, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 120 days.

(21) Appl. No.: 15/925,111

(22) Filed: Mar. 19, 2018

(65) Prior Publication Data

US 2019/0087263 A1 Mar. 21, 2019

(30) Foreign Application Priority Data

Sep. 18, 2017 (KR) ........................ 10-2017-0119661

(51) Int. Cl.
*G06F 11/10* (2006.01)

(52) U.S. Cl.
CPC ...... *G06F 11/1048* (2013.01); *G06F 11/1044* (2013.01); *G06F 11/1072* (2013.01)

(58) Field of Classification Search
CPC ............. G06F 11/1048; G06F 11/1072; G06F 11/1044; G11C 29/42
See application file for complete search history.

(56) References Cited

U.S. PATENT DOCUMENTS

| 7,392,456 B2 | 6/2008 | Leung et al. |
| 7,765,455 B2 | 7/2010 | Hoya et al. |
| 7,930,615 B2 | 4/2011 | Kohler et al. |
| 9,003,260 B2 | 4/2015 | Langadi et al. |
| 9,311,181 B2 | 4/2016 | Lee et al. |
| 9,342,402 B1 | 5/2016 | Ong et al. |
| 2009/0276680 A1* | 11/2009 | Chiu .................... G06F 11/1068 714/752 |
| 2014/0223256 A1* | 8/2014 | Sakai .................. G06F 11/1012 714/758 |
| 2015/0089316 A1 | 3/2015 | Zhang et al. |
| 2016/0231962 A1 | 8/2016 | Ware et al. |

(Continued)

OTHER PUBLICATIONS

T. Hong, T. Shih, C. Lin and B. Vo, "Merging Two Sets of Erasable Itemsets," 2016 International Computer Symposium (ICS), Chiayi, 2016, pp. 90-93. (Year: 2016).*

(Continued)

*Primary Examiner* — Cynthia Britt
(74) *Attorney, Agent, or Firm* — Myers Bigel, P.A.

(57) ABSTRACT

A memory device is configured to perform a parallel read-modify-write operation, which generates a syndrome for first partial data read from a memory cell array and second partial data according to a data mask option, corrects an error of the second partial data, generates merged data by combining second data with the corrected second partial data, and generates an internal parity for the merged data. The memory device sets the second partial data to binary values of 0, generates third data by combining the second partial data set to the binary values of 0 with the second data, generates a third parity for the third data, and generates an internal parity for the merged data based on the syndrome, a partial parity, and the third parity.

20 Claims, 7 Drawing Sheets

(56) References Cited

U.S. PATENT DOCUMENTS

2017/0109232 A1    4/2017  Cha et al.
2018/0225173 A1*   8/2018  Baek .................. G06F 11/1048

OTHER PUBLICATIONS

M. Kang, W. Lee and S. Kim, "Subpage-Aware Solid State Drive for Improving Lifetime and Performance," in IEEE Transactions on Computers, vol. 67, No. 10, pp. 1492-1505, Oct. 1, 2018. (Year: 2018).*

H. Lee, M. Kim, H. Kim, H. Kim and H. Lee, "Integration and Boost of a Read-Modify-Write Module in Phase Change Memory System," in IEEE Transactions on Computers. (Year: 2019).*

* cited by examiner

MEMORY DEVICE FOR PERFORMING PARALLEL READ-MODIFY-WRITE OPERATION

CROSS-REFERENCE TO RELATED APPLICATION

This application claims the benefit of and priority from Korean Patent Application No. 10-2017-0119661, filed on Sep. 18, 2017, in the Korean Intellectual Property Office, the disclosure of which is incorporated herein in its entirety by reference.

FIELD

The inventive concepts relate to an error correction circuit and a memory device including the same, and more particularly, to an error correction circuit and a memory device including the same configured to perform a read-modify-write operation.

BACKGROUND

A memory device may provide a data mask option to perform a masked write operation in which one or more portions of a data word in a write operation retain an old data value and one or more other portions of the data word are updated with a new data value. The masked write operation may include reading old data, modifying a parity bit for old data and new data via an error correction code (ECC) circuit, writing data in which the old data and the new data are combined, and changing a parity bit. To satisfy high-speed timing requirements of the memory device, a higher speed of the read-modify-write operation performed in the masked write operation may be desired.

SUMMARY

The inventive concepts provide an error correction code (ECC) circuit, and a memory device, and a method of operating the ECC circuit performing a parallel read-modify-write operation.

According to an aspect of the inventive concepts, there is provided an error correction code (ECC) circuit including: a first ECC circuit configured to receive first data including a first partial data and a second partial data, and second data, to correct one or more errors in the second partial data, and to generate a merged data by combining the second data with the corrected second partial data; and a second ECC circuit configured to set the second partial data to binary values of 0, to generate third data by combining the second partial data set to the binary values of 0 with the second data, to generate a third parity for the third data, and to generate an internal parity for the merged data by using the third parity.

According to another aspect of the inventive concepts, there is provided a memory device including: a memory cell array comprising a plurality of memory cells and being configured to output first data stored in the memory cells according to a data mask option; and an error correction circuit configured to generate a merged data and an internal parity for the merged data based on the first data and the second data according to the data mask option, wherein the error correction circuit including: a first ECC circuit configured to receive first data including a first partial data and a second partial data, and second data, to correct one or more errors included in the second partial data, and to generate a merged data by combining the second data with the corrected second partial data; and a second ECC circuit configured to set the second partial data to binary values of 0, to generate third data by combining the second partial data set to the binary values of 0 with the second data, to generate a third parity for the third data, and to generate an internal parity for the merged data by using the third parity.

According to another aspect of the inventive concepts, there is provided an operation method including: (a) receiving first data includes a first partial data and a second partial data, and second data; (b) correcting one or more errors in the second partial data; (c) generating a merged data by combining the second data with the corrected second data; (d) setting the second partial data to binary values of 0 and generating third data by combining the second partial data set to the binary values of 0 with the second data; (e) generating a third parity for the third data; and (f) generating an internal parity for the merged data by using the third parity.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Figure 1:
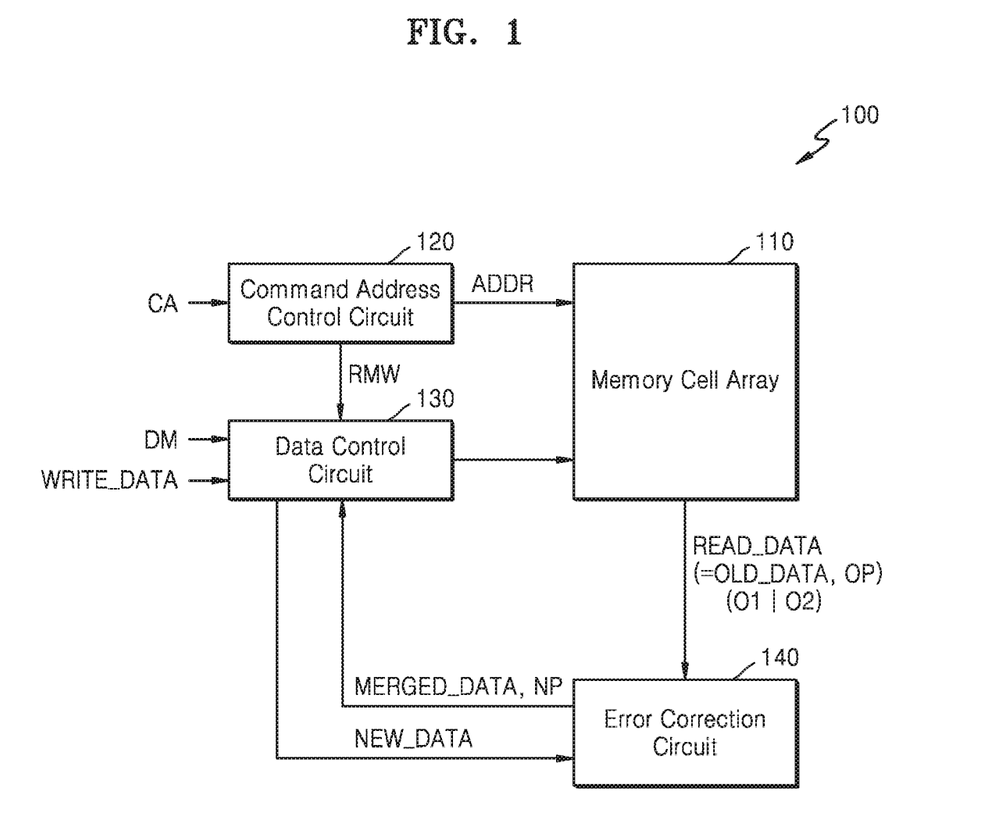
FIG. 1 is a block diagram illustrating a memory device performing a parallel read-modify-write operation according to some embodiments of the inventive concepts.

FIG. 1 is a block diagram illustrating a memory device 100 performing a parallel read-modify-write operation according to some embodiments of the inventive concepts.

Referring to FIG. 1, the memory device 100 may include a memory cell array 110, a command address control circuit 120, a data control circuit 130, and an error correction circuit 140.

The memory cell array 110 may include a plurality of memory cells provided in a matrix form arranged in rows and columns. The memory cell array 110 may include a plurality of word lines and a plurality of bit lines connected to the memory cells. The plurality of word lines may be connected to the rows of the memory cells and the plurality of bit lines may be connected to the columns of the memory cells. The memory cells of the memory cell array 110 may include dynamic random-access memory (DRAM) cells, static RAM (SRAM) cells, flash memory cells, phase change RAM (PRAM) cells, resistance RAM (ReRAM) cells, magnetoresistive RAM (MRAM) cells, or other types of memory cells.

The memory cell array 110 may include typical circuits associated with the memory device 100, such as row decoders, column decoders, and sense amplifiers. The row decoder may select any one of the plurality of word lines connected to the memory cell array 110. The row decoder may decode a row address received from the command address control circuit 120, select any one word line corresponding to the row address, and activate the selected word line.

The column decoder may select a certain bit line among the plurality of bit lines of the memory cell array 110. The column decoder may decode a column address received from the command address control circuit 120 and select a certain bit line corresponding to the column address. The sense amplifiers may be connected to the bit lines of the memory cell array 110.

The sense amplifiers may sense a voltage change of the selected bit line among the plurality of bit lines, and amplify and output the sensed voltage change. Data output by the sense amplifiers based on the sensed and amplified voltage may be output to the outside (e.g., to an external device) via the data control circuit 130 and data input/output pins.

The command address control circuit 120 may receive command address signals CA from an external device of the memory device 100, for example, a central processing unit (CPU) or a memory controller. An active command, a read command, a write command, a precharge command, or the like may be generated by a combination of the received command address signals CA.

The command address control circuit 120 may receive the command address signals CA indicating a read-modify-write command RMW. The read-modify-write command RMW may be provided to the data control circuit 130 to perform a masked write operation or a read-modify-write operation. Hereinafter, the masked write operation will be collectively referred to as the read-modify-write operation.

The command address control circuit 120 may receive the command address signals CA indicating addresses ADDR of the memory cells to be accessed in the memory cell array 110. The addresses ADDR may be provided to the memory cell array 110 and a data access operation of the memory cells addressed by the addresses ADDR may be performed.

The data access operation may be configured to store a plurality of data words in the memory cells of the addresses ADDR and to read the stored data words. Each data word may include, for example, data of 128 bits. As another example, each data word may include data of 32 data bits, 64 data bits, 256 data bits, 512 data bits, or the like.

The data word stored in the memory cell array 110 may include a soft data error or a hard data error. One or more data bits in the data word may be flipped during storage into or reading from the memory cell array 110, and thus, a value thereof may be changed. Alternatively, the memory cells in the memory cell array 110 may be damaged, thereby preventing accurate storage and reading of one or more data bits. Accordingly, it may be assumed that the data word read from the memory cell array 110 includes such a data error.

To reduce the data error, the memory device 100 may include the error correction circuit 140 to generate a parity including one or more parity bits for the data word and to store the generated parity in the memory cell array 110. Data output by the data access operation of the memory cell array 110 may be provided to the error correction circuit 140 as a code word in which the parity is added to the data word.

The code word output from the memory cell array 110 to the error correction circuit 140 will be referred to as read data READ_DATA associated with the read-modify-write operation. The read data READ_DATA may include first data OLD_DATA as the data word and a first parity OP for the first data OLD_DATA. Illustratively, the memory cell array 110 may output the read data READ_DATA of 136 bits, the first data OLD_DATA may include data of 128 bits, and the first parity OP may include data of 8 bits. It will be understood that, although the terms first, second, third, etc. may be used herein to describe various elements, elements should not be limited by these terms; rather, these terms are only used to distinguish one element from another element. Thus, a first element discussed below could be termed a second element without departing from the scope of the present inventive concepts.

The data control circuit 130 may receive a write data WRITE_DATA via the data input/output pins together with the data mask signal DM. The data mask signal DM may indicate new bits (or bytes) to be updated in the received write data WRITE_DATA and previous bits (or bytes) to be retained as the first data OLD_DATA of the read data READ_DATA.

A matching bit of the write data WRITE_DATA corresponding to a logic low of the data mask signal DM will be written to the memory cell array 110 as new data. The matching bit of the write data WRITE_DATA corresponding to logic high of the data mask signal DM will be masked and be retained as the matching bit of the first data OLD_DATA.

In the embodiment, it is assumed that the read data READ_DATA output from the memory cell array 110 includes the first data OLD_DATA and the first parity OP, and an unmasked data among the write data WRITE_DATA includes second data NEW_DATA or new data N1. In addition, it is assumed that the first data OLD_DATA includes a first partial data O1 and a second partial data O2. From an aspect of the read-modify-write operation, it is defined that the first partial data O1 is data to be updated as the second data NEW_DATA or the new data N1, and the second partial data O2 is the previous data to be retained in masked write data WRITE_DATA.

Illustratively, the write data WRITE_DATA of 128 bits may be applied to the memory device 100. In the write data WRITE_DATA of 128 bits, the second data NEW_DATA or the new data N1 may include 120 bits according to the data mask option. The remaining 8 bits of the write data WRITE_DATA of 128 bits may include the second partial data O2. Accordingly, the first partial data O1 may be updated to the second data NEW_DATA of 120 bits or the new data N1, and the second partial data O2 of the 8 bits may be retained.

When the data mask option of the memory device 100 is not provided, the error correction circuit 140 may generate a parity for the write data WRITE_DATA. In this case, the write data WRITE_DATA may be a completely new data to be written in the memory cell array 110. The parity of the entirely new write data WRITE_DATA may be stored in the memory cell array 110 together with the write data WRITE_DATA. When data is read from the memory cell array 110, the error correction circuit 140 may decode the parity to detect and/or correct any error in the read data or the parity.

When the data mask option of the memory device 100 is provided, the new data N1 in the write data WRITE_DATA may be combined with the previous data of a masked portion. However, since there may be one or more errors in the previous data before the new data N1 and the previous data are combined, an error correction operation for the previous data may be required. In addition, a new parity may need to be generated for data in which the new data N1 and the previous data are combined. However, before the new parity is generated, the error correction operation for a previous parity may need to be performed.

Here, the new parity for the combined data may depend not only on the new data N1 of the write data WRITE_DATA but also on the previous data being masked. When steps of the error correction operation are sequentially performed, the time required for the error correction operation may be long. Because of this reason, a sequential error correction operation may be unsuitable in the case of high-speed memory devices. On the other hand, when the steps of the error correction operation are performed in parallel in accordance with embodiments of the inventive concepts, the memory device 100 may satisfy a high-speed timing requirement.

The error correction circuit 140 may perform operation steps of the read-modify-write operation according to the data masking operation, in parallel. In other words, the error correction circuit 140 may simultaneously perform an operation of generating data in which the new data N1 and the previous data are combined or merged, and an operation of generating a parity for the combined or merged data. Thus, the read-modify-write operation may be performed in a short time.

The error correction circuit 140 may perform, in parallel, an operation of generating a merged data MERGED_DATA by combining the new data N1 and the previous data, and an operation of generating an internal parity NP for the merged data MERGED_DATA.

In the error correction circuit 140, operations for generating the merged data MERGED_DATA may include: receiving the first data OLD_DATA including the first partial data O1 and the second partial data O2, and the second data NEW_DATA; generating the syndrome that indicates an existence of one or more errors in the first partial data O1 and the second partial data O2; and correcting one or more errors included in the first partial data O1 and the second partial data O2 by decoding the syndrome.

In addition, operations for generating the merged data MERGED_DATA may further include: setting the first partial data O1 to binary values of 0; combining the first partial data O1 of the binary values of 0 with the corrected second partial data O2; and generating a partial parity for the corrected second partial data O2 by using the combined data. According to some embodiments of the inventive concepts, an operation of generating the partial parity for the corrected second partial data O2 may include: setting the corrected first partial data O1 to the binary values of 0 instead of the first partial data having the binary values of 0; combining the corrected first partial data O1 of the binary values of 0 and the corrected second partial data O2; and generating the partial parity for the corrected second partial data O2 by using the combined data.

Thereafter, operations for generating the merged data MERGED_DATA may further include an operation of generating the merged data MERGED_DATA by combining the second data NEW_DATA and the corrected second partial data O2.

In the error correction circuit 140, operations for generating the internal parity NP for the merged data MERGED_DATA may include: setting the second partial data O2 to the binary values of 0; generating third data by combining the second data NEW_DATA and the second partial data O2 of the binary values of 0 after having set the second partial data O2 to the binary values of 0; generating a third parity for the third data; and generating the internal parity NP for the merged data MERGED_DATA based on the syndrome, the partial parity, and the third parity.

Figure 2:
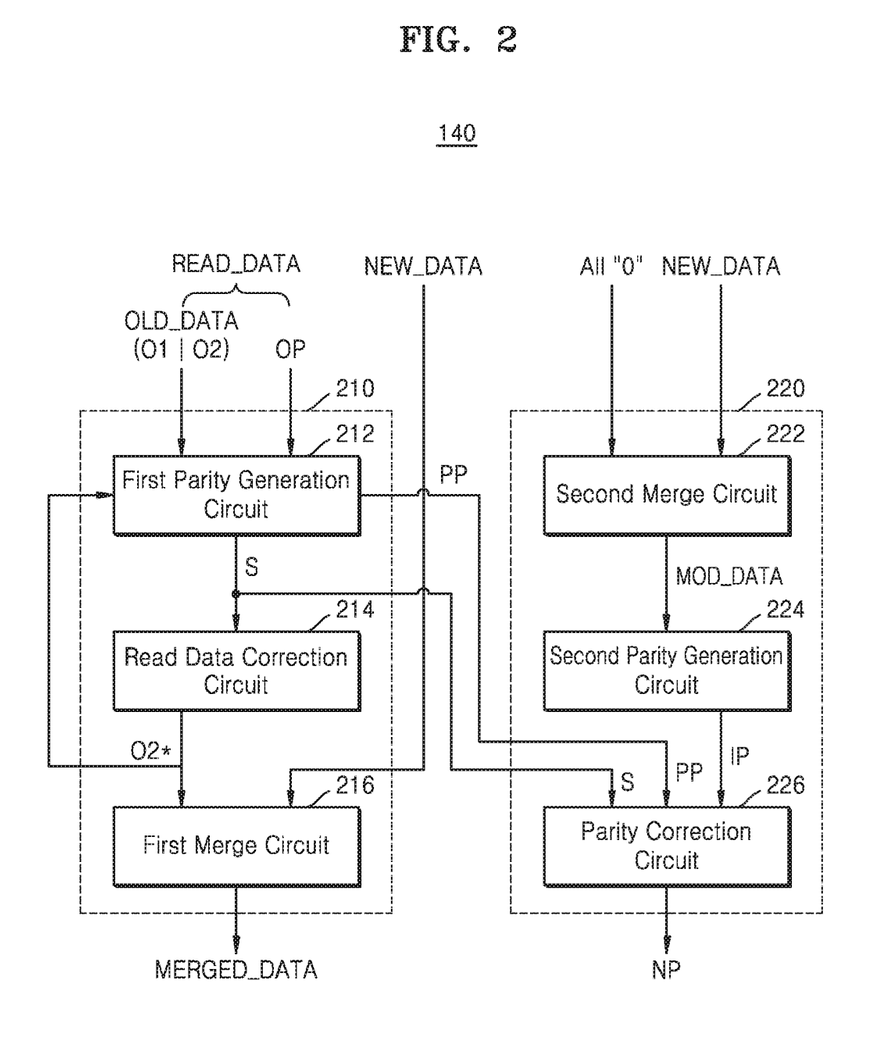
FIG. 2 is a block diagram illustrating an error correction circuit according to some embodiments of the inventive concepts.

FIG. 2 is a block diagram illustrating the error correction circuit 140 according to some embodiments of the inventive concepts. For convenience of explanation, it is assumed that the read data READ_DATA of 136 bits output from the memory cell array 110 includes the first data OLD_DATA of 128 bits and the first parity OP of 8 bits.

Referring to FIG. 2, the error correction circuit 140 may include a first parity generation circuit 212, a read data correction circuit 214, and a first merge circuit 216. The first parity generation circuit 212, the read data correction circuit 214 and the first merge circuit 216 may generate data in which the second data NEW_DATA or the new data N1 and the second partial data O2 or the previous data are combined, that is, the merged data MERGED_DATA.

The first parity generation circuit 212 may receive the read data READ_DATA composed of the first data OLD_DATA and the first parity OP for the first data OLD_DATA. The first parity generation circuit 212 may generate the syndrome S that indicates an existence of one or more errors in the first data OLD_DATA including the first partial data O1 and the second partial data O2. The first parity generation circuit 212 may generate the syndrome S of 8 bits for the first data OLD_DATA of 128 bits.

The read data correction circuit 214 may provide a position of an error present in the first data OLD_DATA by decoding the syndrome S. The read data correction circuit 214 may generate a decoded signal of 128 bits by decoding the syndrome S of 8 bits. A decoding signal of 128 bits may be in one-to-one correspondence to the first data OLD_DATA of 128 bits in bit units. Illustratively, in the decoded signal of 128 bits, a binary value of 1 may indicate that the matching bit of the first data OLD_DATA is an error.

The read data correction circuit 214 may correct the error of the first data OLD_DATA of 128 bits by using the decoded signal of 128 bits. As a result of an error correction of the first data OLD_DATA, a corrected first partial data O1* and a corrected second partial data O2* may be generated. The corrected second partial data O2* may be provided to the first parity generation circuit 212 and the first merge circuit 216.

The first parity generation circuit 212 may generate a partial parity PP by using the Hamming code or the extended Hamming code having a fast processing time for the corrected second partial data O2*.

The Hamming code may be added to an underlying data and when an error rate is small, may detect and correct errors. In general, the Hamming code having a Hamming distance of 3 may detect and correct a single-bit error, but may not be capable of detecting a double-bit error of some code word. When the Hamming code is extended by an extra parity bit, the decoder may detect and correct the single-bit error, and simultaneously detect the double-bit error. At this time, a minimum hamming distance of the Hamming code may increase to 4. This extended Hamming code is known as single error correction double error detection (SECDED) code and is commonly used to preserve data integrity.

The SECDED code may be a server-class code of the Hamming codes which are linear error correction codes. More generally, a (n, k) binary Hamming code (n and k are integers) may be used to encode k bits of data to a code word of n bits (n>k). A total of n bits may include not only (n−k) parity bits (or check bits) but also k data bits.

According to some embodiments, the first parity generation circuit 212 may generate the partial parity PP by using the Bose Chaudhuri Hocquenghem (BCH) code and the Reed-Solomon (RS) code. The BCH code may be one of block codes which use the Galois field operation. According to the block codes such as the BCH code and the RS code, an error location may be calculated by using an error location search equation. For example, an error location search may be performed by sequentially substituting each element of the Galois field, which is not 0, into the error location search equation to search for a root of the error location search equation.

The first parity generation circuit 212 may set the binary values of 0 to bits corresponding to the corrected first partial data O1*. The first parity generation circuit 212 may combine the corrected first partial data O1* set to the binary values of 0 with the corrected second partial data O2*, and may generate the partial parity PP for the second partial data O2* by using the combined data. According to some embodiments, the first parity generation circuit 212 may set the binary values of 0 to bits corresponding to the first partial data O1, combine the first partial data O1 set to the binary values of 0 with the corrected second partial data O2*, and generate the partial parity PP for the corrected second partial data O2* by using the combined data.

The syndrome S and the partial parity PP generated in the first parity generation circuit 212 may be provided to the parity correction circuit 226.

The first merge circuit 216 may generate the merged data MERGED_DATA by combining the second data NEW_DATA, which is a new data of the write data WRITE_DATA, with the corrected second partial data O2*. The merged data MERGED_DATA may be written to the memory cell array (110 in FIG. 1) as a final data of the read-modify-write operation.

The first parity generation circuit 212, the read data correction circuit 214, and the first merge circuit 216 may be circuitries to generate the merged data MERGED_DATA based on an error detection and correction operation, that is, an ECC operation. Accordingly, the first parity generation circuit 212, the read data correction circuit 214, and the first merge circuit 216 may be referred to as a first ECC circuit 210.

The first ECC circuit 210 may receive the first data OLD_DATA including the first partial data O1 and the second partial data O2, generate the corrected second partial data O2* by correcting an error in the first data OLD_DATA, and generate the merged data MERGED_DATA by combining the second data NEW_DATA which is the new data N1 of the write data WRITE_DATA with the corrected second partial data O2*. The internal parity NP for the merged data MERGED_DATA may be generated in a second ECC circuit 220.

The second ECC circuit 220 may use the partial parity PP and the syndrome S provided from the first parity generation circuit 212 of the first ECC circuit 210 so as to generate the internal parity NP for the merged data MERGED_DATA. The second ECC circuit 220 may include a second merge circuit 222, a second parity generation circuit 224, and a parity correction circuit 226.

The second merge circuit 222 may receive the second data NEW_DATA which is the new data N1 among the write data WRITE_DATA. The second merge circuit 222 may set all data bits masked in the write data WRITE_DATA to the binary values of 0. Since the data bits masked in the write data WRITE_DATA are the same as the second partial data O2 which is the previous data, the data bits set to the binary values of 0 may correspond to the second partial data O2. Accordingly, the second merge circuit 222 may set the second partial data O2 to the binary values of 0. The second merge circuit 222 may generate the third data MOD_DATA by combining the second data NEW_DATA and the second partial data O2 of the binary values of 0. Thus, the third data MOD_DATA may be referred to as an encoded (or modified) data such that the bits of the binary values of 0 are included in the second data NEW_DATA. The third data MOD_DATA may be provided to the second parity generation circuit 224.

The second parity generation circuit 224 may receive the third data MOD_DATA, and generate the third parity IP for the third data MOD_DATA by using the Hamming code or the extended Hamming code. According to some embodiments, the second parity generation circuit 224 may generate the third parity IP for the third data MOD_DATA by using the BCH code and the RS code. The third parity IP may be provided to the parity correction circuit 226.

The parity correction circuit 226 may receive the syndrome S of the first parity generation circuit 212, the partial parity PP, and the third parity IP of the second parity generation circuit 224. The parity correction circuit 226 may generate the internal parity NP based on the syndrome S, the partial parity PP, and the third parity IP. The internal parity NP may be the parity for the merged data MERGED_DATA generated in the first ECC circuit 210.

The merged data MERGED_DATA and the internal parity NP may be provided to the memory cell array (110 in FIG. 1) via the data control circuit (130 in FIG. 1). The merged data MERGED_DATA and the internal parity NP may be written to the memory cells addressed by the addresses (ADDR in FIG. 1).

Figure 3:
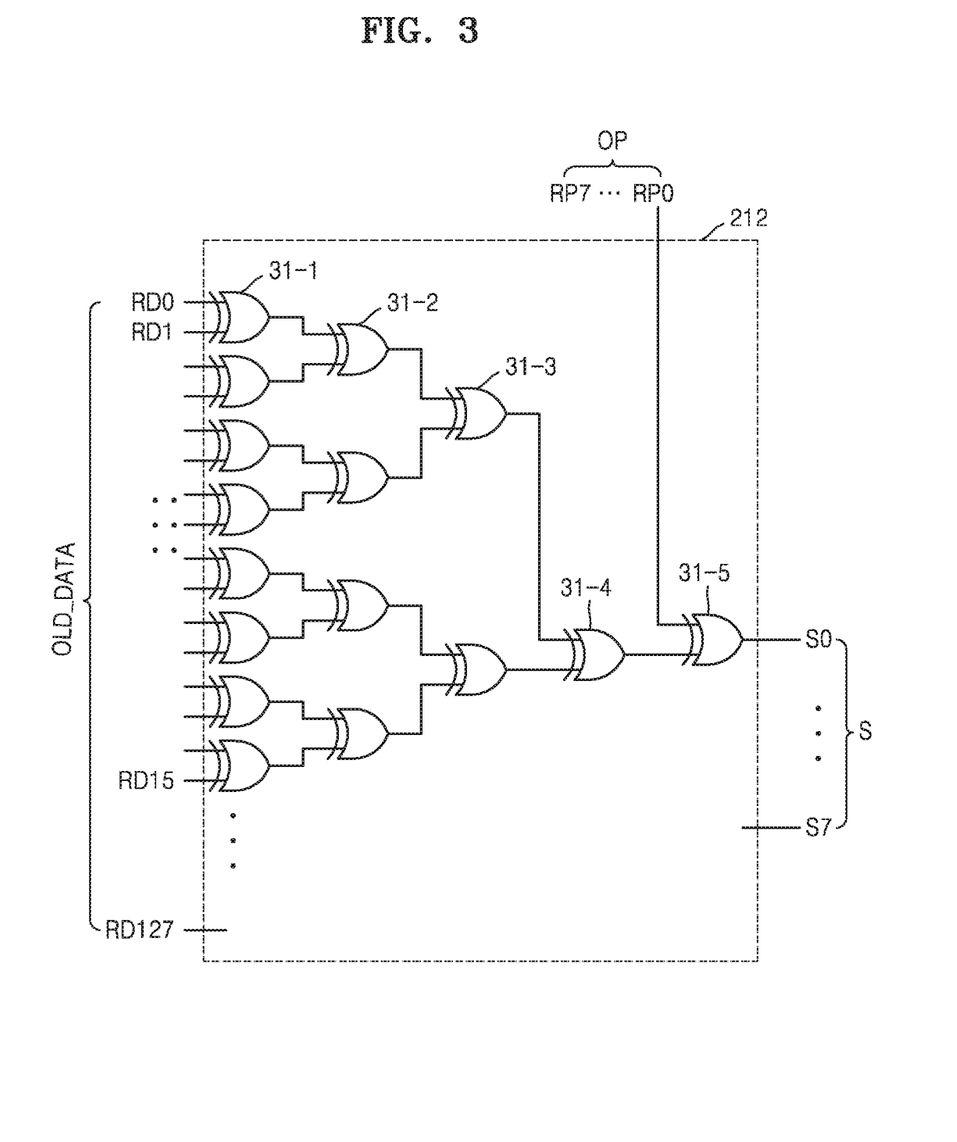
FIG. 3 is a circuit diagram illustrating a portion of a first parity generation circuit in FIG. 2.

FIG. 3 is a circuit diagram illustrating a portion of the first parity generation circuit 212 in FIG. 2.

Referring to FIG. 3, the first parity generation circuit 212 may generate the syndrome S indicating an existence of one or more errors in data output from the memory cell array 110, for example, a 128-bit first data OLD_DATA. The first parity generation circuit 212 may include 64 2-input exclusive-OR circuits 31-1 (hereinafter, referred to as XOR circuits) on a first stage, 32 XOR circuits 31-2 on a second stage, 16 XOR circuits 31-3 on a third stage, 8 XOR circuits 31-4 on a fourth stage, and 8 XOR circuits 31-5 on a fifth stage.

The XOR circuits on the first through fifth stages may be connected in a cascade connection. Output terminals of the XOR circuits 31-1 on the first stage may be connected to input terminals of the XOR circuits 31-2 on the second stage. The output terminals of the XOR circuits 31-2 on the second stage may be connected to the input terminals of the XOR circuits 31-3 on the third stage. The output terminals of the XOR circuits 31-3 on the third stage may be connected to the input terminals of the XOR circuits 31-4 on the fourth stage. Each output terminal of the XOR circuits 31-4 on the fourth stage may be connected to one input terminal of corresponding XOR circuits 31-5 on the fifth stage. Corresponding parity bits RP0 to RP7 of the first parity OP for the first data OLD_DATA may be connected to the other input terminal of the XOR circuits 31-5 on the fifth stage.

128 bits of the first data OLD_DATA RD0 through RD127 may be input to the input terminals of the XOR circuits 31-1 on the first stage. 8 syndrome bits S0 through S7 of the syndrome S may be output from the output terminals of the XOR circuits 31-5 on the fifth stage. The syndrome S including the syndrome bits S0 through S7 may indicate an existence of one or more errors in the first data OLD_DATA.

Figure 4:
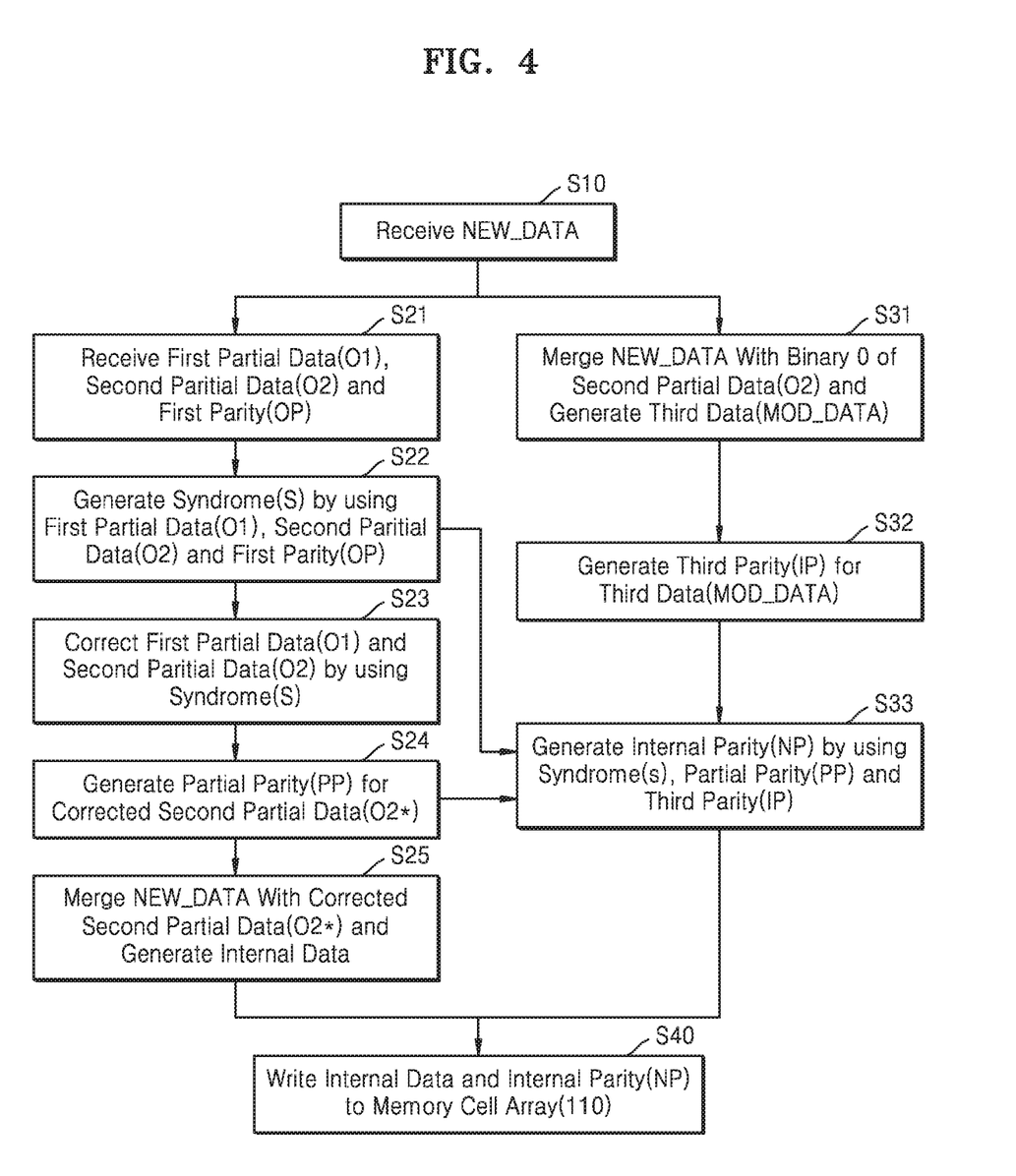
FIG. 4 is a flowchart for explaining an operation of an error correction circuit according to some embodiments of the inventive concepts.

FIG. 4 is a flow chart for explaining example operations of the error correction circuit 140 in FIG. 2.

Referring to FIG. 4, the error correction circuit 140 may receive the second data NEW_DATA obtained as a result of the masking operation by the data control circuit (130 in FIG. 1) (S10). The masking operation of the data control circuit 130 may provide, as the second data NEW_DATA, new bits to be updated among the write data WRITE_DATA received together with the data mask signal DM. The matching bits of the write data WRITE_DATA corresponding to the logic low of the data mask signal DM may be provided as the second data NEW_DATA.

The error correction circuit 140 may receive the read data READ_DATA output from the memory cell array 110 (S21). The read data READ_DATA may include the first partial data O1, the second partial data O2, and the first parity OP. In the first data OLD_DATA including the first partial data O1 and the second partial data O2, the first partial data O1 may be data to be updated to the second data NEW_DATA, and the second partial data O2 may be data to be retained in the masked write data WRITE_DATA.

The error correction circuit 140 may generate the syndrome S indicating an existence of one or more errors in the first partial data O1 and the second partial data O2 of the first data OLD_DATA (S22). The error correction circuit 140 may generate the syndrome S by using the first data OLD_DATA and the first parity OP. The error correction circuit 140 may generate the syndrome S of 8 bits for the first data OLD_DATA of 128 bits.

The error correction circuit 140 may correct errors of the first partial data O1 and the second partial data O2 of the first data OLD_DATA by using the syndrome S (S23). The error correction circuit 140 may generate the decoded signal of 128 bits by decoding the syndrome bits of 8 bits (S0 through S7 in FIG. 3), and perform the error correction for the first data OLD_DATA of 128 bits corresponding to the decoded signal of 128 bits, in bit units. As a result of the error correction performed in step S23, the corrected first partial data O1* and the corrected second partial data O2* may be generated.

The error correction circuit 140 may generate the partial parity PP for the corrected second partial data O2* (S24). The error correction circuit 140 may set the binary values of 0 to bits corresponding to the first partial data O1, or set the binary values of 0 to bits corresponding to the corrected first partial data O1*. The error correction circuit 140 may combine the first partial data O1 set to the binary values of 0 with the corrected second partial data O2*, and generate the partial parity PP for the combined data (0|O2*) by using a Hamming code method (H(0|O2*)). The combined data (0|O2*) denotes the first partial data O1 set to the binary values of 0 and the corrected second partial data O2*. Alternatively, the error correction circuit 140 may combine the first partial data O1* set to the binary values of 0 with the corrected second partial data O2*, and generate the partial parity PP for the combined data 0|O2* by using the method of the Hamming code H(0|O2*).

The error correction circuit 140 may generate the merged data MERGED_DATA by combining the second data NEW_ DATA and the corrected second external data O2* (S25).

The error correction circuit 140 may set all data masked in the write data WRITE_DATA to the binary values of 0 (S31). Since the masked data in the write data WRITE_DATA corresponds to the second partial data O2, the second partial data O2 may be set to the binary values of 0. Accordingly, the error correction circuit 140 may generate the third data MOD_DATA by combining the second data NEW_DATA and the second partial data O2 set to the binary values of 0.

The error correction circuit 140 may generate the third parity IP for the third data MOD_DATA (S32). The error correction circuit 140 may generate the third parity IP for the third data MOD_DATA by using the Hamming code method (H(N1|0)).

The error correction circuit 140 may generate the internal parity NP based on the syndrome S generated in step S22, the partial parity PP generated in step S24, and the third parity IP (S33). The internal parity NP may be the parity for the merged data MERGED_DATA in step S25.

The merged data MERGED_DATA and the internal parity NP may be written into the memory cell array 110 (S40).

In the above-described operation method of the error correction circuit 140, operations performed in steps S21 through S25, and operations performed in steps S31 through S33 may be performed in parallel. In other words, in the error correction circuit 140, operations for generating the merged data MERGED_DATA by combining the second data NEW_DATA and the corrected second partial data O2*, and operations for generating the internal parity NP for the merged data MERGED_DATA may be performed in parallel. Thus, the read-modify-write operation according to the data mask option may be performed in a short time.

According to some embodiments, methods of operating the error correction circuit 140 described with reference to FIG. 4 may be implemented by using circuit hardware in the memory device (100 of FIG. 1) and/or by using hardware capable of executing or configured to execute coded instructions stored on a non-transitory computer readable data storage medium or software/firmware in a micro-code type. Illustratively and by way of example, methods of operating the error correction circuit 140 may be provided in a computer program product which is implemented as a software executable object or a set of coded instructions for execution by a processor responding to instructions. Alternatively, methods of operating the error correction circuit 140 may be implemented in whole or in part by using hardware components such as application specific integrated circuits (ASICs), field programmable gate arrays (FPGAs), state machines, controllers, and/or other hardware components, and/or other hardware devices, or a combination of hardware, software, and firmware components. The term "and/or" includes any and all combinations of one or more of the associated listed items.

Figure 5:
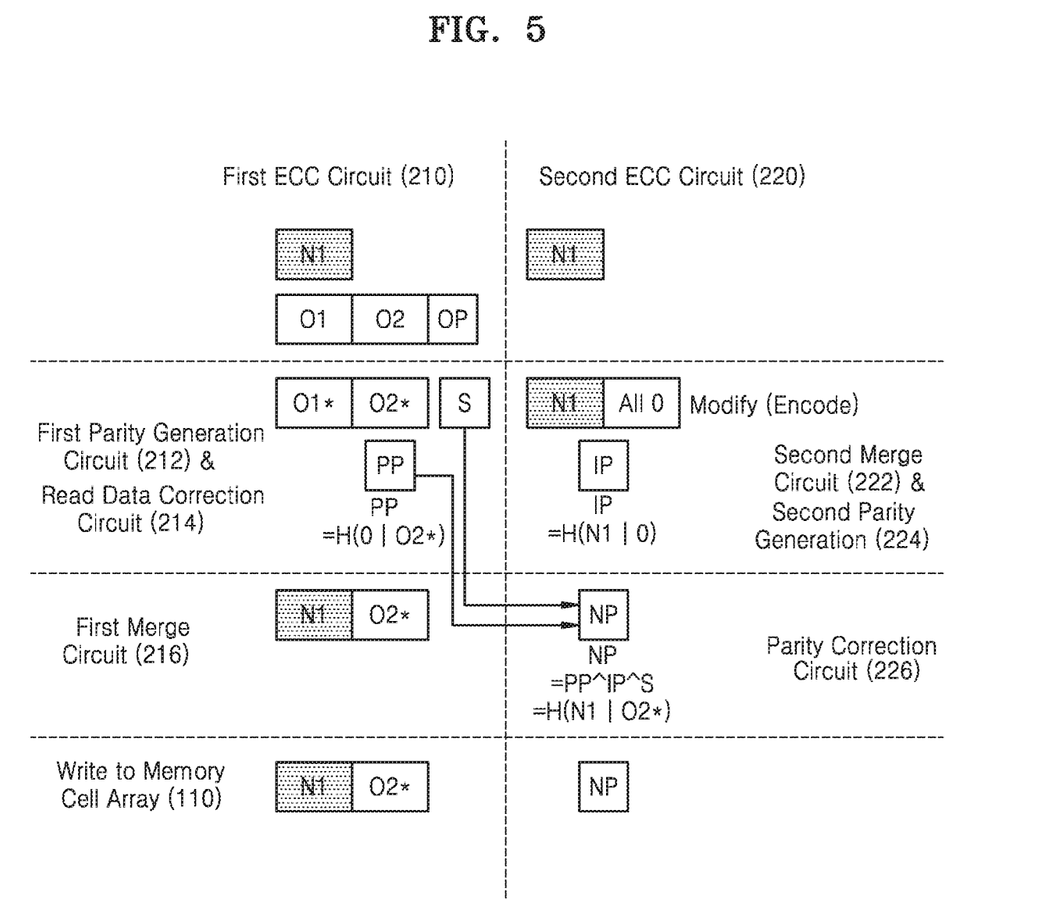
FIG. 5 is a diagram illustrating a data structure according to an operation of an error correction circuit according to some embodiments of the inventive concepts.

FIG. 5 is a diagram illustrating a data structure according to an operation of the error correction circuit 140 according to some embodiments of the inventive concepts. FIG. 5 illustrates an example in which the first partial data O1 is updated to the new data N1 and the second partial data O2 is retained during the read-modify-write operation, in a structure of the first data OLD_DATA including the first partial data O1 and the second partial data O2. The new data N1 may be data corresponding to the second data NEW_DATA obtained as a result of the masking operation by the data control circuit (130 in FIG. 1).

The new data N1 may be received by the first and second ECC circuits 210 and 220.

The first parity generation circuit 212 of the first ECC circuit 210 may receive the first partial data O1, the second partial data O2, and the first parity OP, and generate the syndrome S indicating an existence of one or more errors in the first partial data O1 and the second partial data O2.

The read data correction circuit 214 of the first ECC circuit 210 may correct an error existing in the first partial data O1 and the second partial data O2 by decoding the syndrome S. As a result of the error correction, the corrected first partial data O1* and the corrected second partial data O2* may be generated.

The first parity generation circuit 212 of the first ECC circuit 210 may generate the partial parity PP for the corrected second partial data O2*. The first parity generation circuit 212 may set the binary values of 0 to the bits corresponding to the first partial data O1 or the corrected first partial data O1*. The first parity generation circuit 212 generates the partial parity PP by using the Hamming code scheme H(0|O2*) for the first partial data O1 of the binary value 0 and the corrected second partial data O2*. Alternatively, the first parity generation circuit 212 may generate the partial parity PP by using the Hamming code scheme H(0|O2*) for the first partial data O1* of the binary value 0 and the corrected second partial data O2*.

The first merge circuit 216 of the first ECC circuit 210 may generate the merged data MERGED_DATA by combining the new data N1 and the corrected second partial data O2*. The merged data MERGED_DATA may have a data structure of N1|O2*.

The second merge circuit 222 of the second ECC circuit 220 may receive the new data N1. The second merge circuit 222 may set the binary values of 0 to the bits corresponding to the second partial data O2. The second merge circuit 222 may combine the new data N1 with the second partial data O2 of the binary values of 0.

The second parity generation circuit 224 of the second ECC circuit 220 may generate the third parity IP by using the Hamming code scheme H(N1|0) for the combined new data N1 and second partial data O2 of the binary values of 0.

The parity correction circuit 226 of the second ECC circuit 220 may generate the internal parity NP based on the syndrome S provided by the first parity generation circuit 212, the partial parity PP, and the third parity IP provided by the second parity generation circuit 224. The internal parity NP generated by the parity correction circuit 226 may be the same as a parity generated by using the Hamming code scheme H(N1|O2*) for the new data N1 and the corrected second partial data O2*. As a result, the internal parity NP may be the parity for the merged data MERGED_DATA.

The merged data MERGED_DATA, in which the new data N1 output from the first ECC circuit 210 and the corrected second partial data O2*, and the internal parity NP output from the second ECC circuit 220 may be written to the memory cell array 110.

Figure 6:
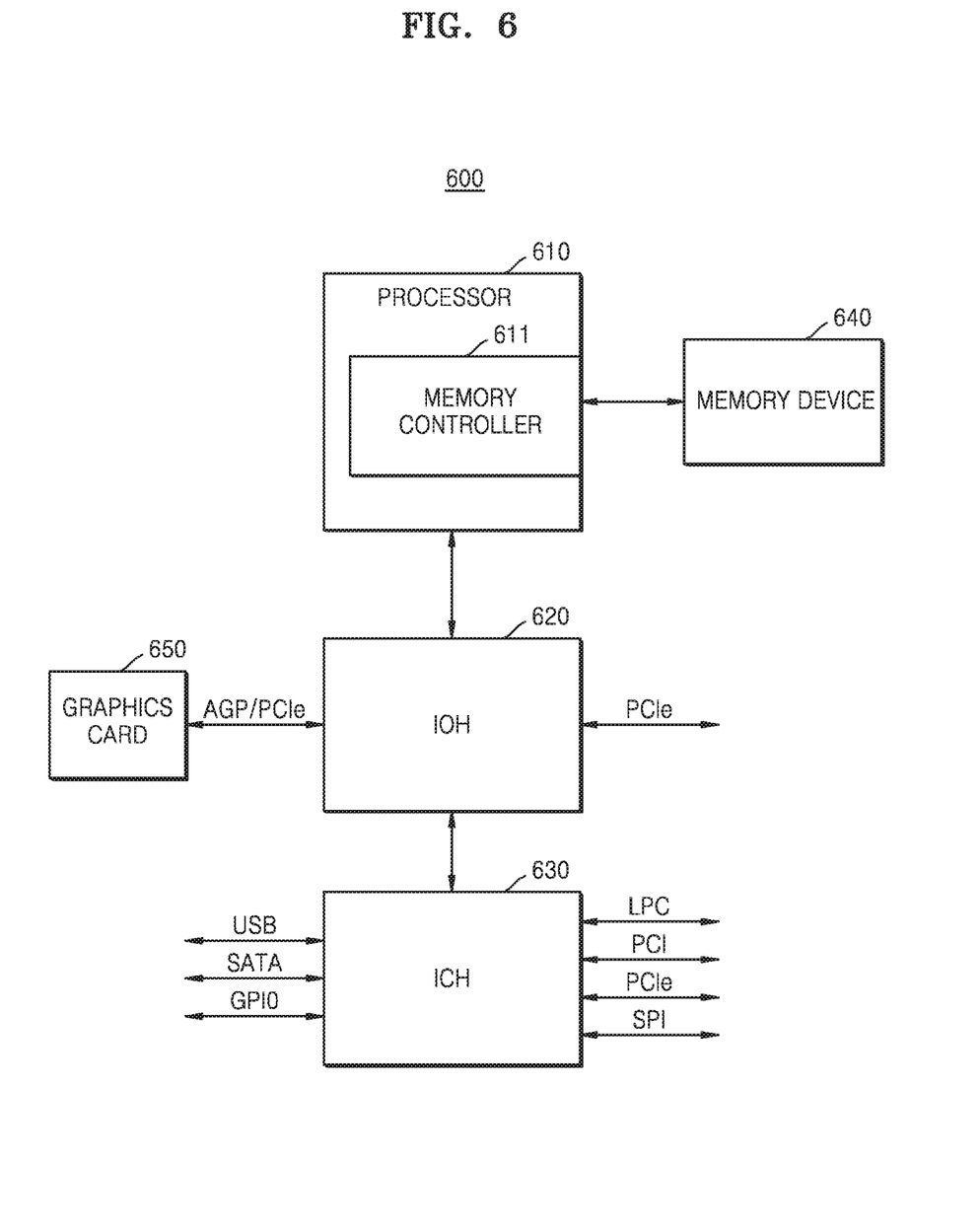
FIG. 6 is a block diagram illustrating an example of applying a memory device performing a parallel read-modify-write operation to a computing system according to embodiments of the inventive concepts.

FIG. 6 is a block diagram illustrating an example of applying the memory device 100 performing the parallel read-modify-write operation to a computer system 600 according to embodiments of the inventive concepts.

Referring to FIG. 6, the computer system 600 may include a processor 610, an input/output hub (IOH) 620, an input/output controller hub (ICH) 630, a memory device 640, and a graphics card 650. According to some embodiments, the computer system 600 may be an arbitrary computing system such as a personal computer (PC), a server computer, a workstation, a laptop, a mobile phone, a smart phone, a personal digital assistant (PDA), a portable multimedia player (PMP), a digital camera, a digital television, a set-top box, a music player, a portable game console, or a navigation system.

The processor 610 may execute various computing functions such as specific calculations or tasks. For example, the processor 610 may be a microprocessor or a central processing unit (CPU). According to some embodiments, the processor 610 may include a single processor core or a plurality of processor cores (multi-cores). For example, the processor 610 may include a dual-core, a quad-core, a hexa-core, or the like. In addition, the computer system 600 including one processor 610 is illustrated in FIG. 6, but the computer system 600 may include a plurality of processors 610 according to some embodiments. In addition, according to some embodiments, the processor 610 may further include a cache memory located internally or externally.

The processor 610 may include a memory controller 611 controlling an operation of the memory device 640. The memory controller 611 included in the processor 610 may be referred to as an integrated memory controller (IMC). According to some embodiments, the memory controller 611 may be arranged in the input/output hub 620. The input/output hub 620 including the memory controller 611 may be referred to as a memory controller hub (MCH).

The memory device 640 may provide the data mask option. In the read-modify-write operation performed according to the data mask option, the memory device 640 may perform, in parallel, an operation of generating the merged data MERGED_DATA by combining the new data N1 and the previous data, and an operation of generating the internal parity NP for the merged data MERGED_DATA.

Operations for generating the merged data MERGED_DATA may include: receiving the first data OLD_DATA including the first partial data O1 and the second partial data O2, and the second data NEW_DATA; generating the syndrome indicating an existence of one or more errors in the first partial data O1 and the second partial data O2; correcting one or more errors included in the first partial data O1 and the second partial data O2 by decoding the syndrome S; generating the partial parity for the corrected second partial data O2*; and generating the merged data MERGED_DATA by combining the second data NEW_DATA with the corrected second partial data O2*.

Operations for generating the internal parity NP for the merged data MERGED_DATA may include: generating the third data by combining the second data NEW_DATA with the second partial data O2 set to the binary values of 0; generating the third parity for the third data; and generating the internal parity NP for the merged data MERGED_DATA based on the syndrome, the partial parity, and the third parity.

The input/output hub 620 may manage data transfer between devices such as the graphics card 650 and the processor 610. The input/output hub 620 may be connected to the processor 610 via various types of interfaces. For example, the input/output hub 620 and the processor 610 may be connected to various standard interfaces such as a front side bus (FSB), a system bus, the HyperTransport, a lightning data transport (LDT), the QuickPath Interconnect (QPI), a common system interface, and a peripheral component interface-express (CSI). The computer system 600 including one input/output hub 620 is illustrated in FIG. 6, but the computer system 600 may include a plurality of input/output hubs 620 according to some embodiments.

The input/output hub 620 may provide interfaces with various devices. For example, the input/output hub 620 may provide an accelerated graphics port (AGP) interface, a peripheral component interface-express (PCIe), a communications streaming architecture (CSA), or the like.

The graphics card 650 may be connected to the input/output hub 620 via the AGP interface or the PCIe. The graphics card 650 may control a display device (not shown) to display an image. The graphics card 650 may include an internal processor and an internal semiconductor memory device to process image data. According to some embodiments, the input/output hub 620 may include the graphics card 650 arranged external to/outside the input/output hub 620 or a graphics device internal to/inside the input/output hub 620 instead of the graphics card 650. The graphics device included in the input/output hub 620 may be referred to as an integrated graphics. In addition, the input/output hub 620, which includes a memory controller and the graphics device, may be referred to as a graphics and memory controller hub (GMCH).

The input/output controller hub 630 may perform data buffering and interface arbitration so that various system interfaces efficiently operate. The input/output controller hub 630 may be connected to the input/output hub 620 via an internal bus. For example, the input/output hub 620 and the input/output controller hub 630 may be connected through a direct media interface (DMI), a hub interface, an enterprise southbridge interface (ESI), a PCIe, or the like.

The input/output controller hub 630 may provide various interfaces with peripheral devices. For example, the input/output controller hub 630 may include a universal serial bus (USB) port, a serial advanced technology attachment (SATA) port, a general purpose input/output (GPIO) port, a low pin count (LPC) bus, a serial peripheral interface (SPI), the PCI, the PCIe, or the like.

According to some embodiments, two or more components of the processor 610, the input/output hub 620, or the input/output controller hub 630 may be implemented as one chipset.

Figure 7:
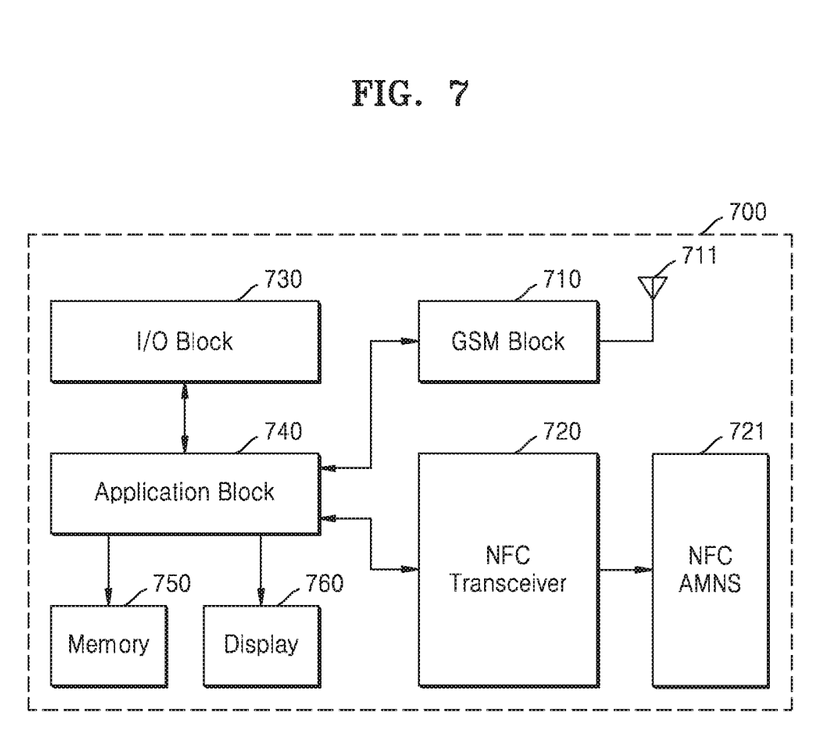
FIG. 7 is a block diagram illustrating an example of applying a memory device performing a parallel read-modify-write operation to a mobile device according to embodiments of the inventive concepts

FIG. 7 is a block diagram illustrating an application of the memory device 100 configured to perform the parallel read-modify-write operation in a mobile device 700 according to some embodiments of the inventive concepts. The mobile device 700 may be a mobile phone or a smart phone.

Referring to FIG. 7, the mobile device 700 may include a global system for mobile communication (GSM) block 710, a near field communication (NFC) transceiver 720, an input/output block 730, an application block 740, a memory 750, and a display 760. Components/blocks of the mobile device 700 are illustratively shown in FIG. 7 by way of example. The mobile device 700 may include more or fewer components/blocks. In addition, even though the GSM technology is shown in the present embodiment, the mobile device 700 may be implemented by using other technologies such as a code division multiple access (CDMA). The blocks of FIG. 7 may be implemented as an integrated circuit. Alternatively, some of the blocks may be implemented as an integrated circuit while other blocks may be implemented as another circuit.

The GSM block 710 may be connected to an antenna 711 and may operate to provide wireless telephone functionality. The GSM block 710 may internally include a receiver and a transmitter configured to perform a corresponding reception operation and a transmission operation, respectively.

The NFC transceiver 720 may be configured to transceive NFC signals by using inductive coupling for wireless communication. The NFC transceiver 720 may provide NFC signals to an NFC antenna matching network system (AMNS) 721, and the NFC antenna matching network system 721 may transmit NFC signals via the inductive coupling. The NFC antenna matching network system 721 may receive the NFC signals provided from other NFC devices and provide the received NFC signals to the NFC transceiver 720.

The transmission and reception of NFC signals by the NFC transceiver 720 may be performed in a time-division manner. Accordingly, a time period over which the NFC transceiver 720 transmits NFC signals may be referred to as a transmission interval, and a corresponding operation mode of the NFC transceiver 720 may be referred to as a transmission mode or an NFC reader transmission mode. In a same manner, a time period over which the NFC transceiver 720 receives NFC signals may be referred to as a reception interval, and a corresponding operation mode of the NFC transceiver 720 may be referred to as a reception mode or an NFC tag reception mode.

The NFC transceiver 720 may operate in accordance with standardized regulations that are described in NFC interface and protocol-1 (NFCIP-1), NFC interface and protocol-2 (NFCIP-2), European Computer manufacturers Association (ECMA)-340, International Organization for Standardization/International Electrotechnical Commission (ISO/IEC) 18092, European Telecommunications Standards Institute (ETSI) Technical Specification (TS) 102 190, ISO 21481, ECMA 352, ETSI TS 102 312, or the like.

The application block 740 may include hardware circuits, for example, one or more processors, and may operate to provide various user applications provided by the mobile device 700. The user applications may include voice call operations, data transmission, data swapping, or the like. The application block 740 may operate in conjunction with the GSM block 710 and/or the NFC transceiver 720 to provide operating characteristics of the GSM block 710 and/or the NFC transceiver 720. Alternatively, the application block 740 may include a program for a point of sale (POS) system. Such a program may provide a credit card purchase function and a payment function using a mobile phone, that is, a smart phone.

The display 760 may display an image in response to display signals received from the application block 740. The image may be provided by application block 740 or may be generated by a camera embedded in the mobile device 700. The display 760 may internally include a frame buffer for temporary storage of pixel values and may include a liquid crystal display screen with associated control circuits.

The input/output block 730 may provide an input function to a user and provide outputs to be received through the application block 740.

The memory 750 may store programs (instructions) and/or data to be used by the application block 740, and may be implemented as RAM, flash memory, resistive memory, or the like. Thus, the memory 750 may include volatile as well as nonvolatile storage elements. For example, the memory 750 may correspond to the memory device 100 shown in FIG. 1.

The memory 750 may be configured to provide the data mask option. In the read-modify-write operation performed according to the data mask option, the memory 750 may perform, in parallel, an operation of generating the merged data MERGED_DATA by combining the new data N1 and the previous data, and an operation of generating the internal parity NP for the merged data MERGED_DATA.

Operations for generating the merged data MERGED_DATA may include: receiving the first data OLD_DATA including the first partial data O1 and the second partial O2, and the second data NEW_DATA; generating the syndrome indicating an existence of one or more errors in the first partial data O1 and the second partial data O2; correcting one or more errors included in the first partial data O1 and the second partial data O2 by decoding the syndrome S; generating the partial parity for the corrected second partial data O2*; and generating the merged data MERGED_DATA by combining the second data NEW_DATA with the corrected second partial data O2*.

Operations for generating the internal parity NP for the merged data MERGED_DATA may include: generating the third data by combining the second data NEW_DATA with the second partial data O2 set to the binary values of 0; generating the third parity for the third data; and generating the internal parity NP for the merged data MERGED_DATA based on the syndrome, the partial parity, and the third parity.

Accordingly, some embodiments of the inventive concepts may implement a read-modify-write operation by generating an initial parity IP based on new data N1 to be written, and correcting the initial parity IP based on a syndrome S indicative of errors in the previous data O1, O2 read from a memory cell array and a partial parity PP based on corrected partial data O2* from the previous data. This may allow for generation of the internal parity NP in parallel with generation of the merged data that combines the new data N1 and the corrected partial data O2*. Embodiments of the inventive concepts may thus generate an internal parity NP that is equivalent to that which may be generated sequentially or responsive to the merged data, but contemporaneously in time with generation of the merged data, thereby improving speed in performing the read-modify-write operation.

Embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the inventive concepts has been particularly shown and described with reference to example embodiments thereof, it will be understood by one of ordinary skill in the art that various changes in form and details may be made therein without departing from the spirit and scope of the inventive concepts as defined by the following claims. Accordingly, the true scope of protection of the inventive concepts should be determined by the technical idea of the following claims.

What is claimed is:

1. An error correction code (ECC) circuit comprising:
   a first ECC circuit configured to receive first data and second data, the first data comprising first partial data and second partial data, to correct one or more errors in the second partial data to generate corrected second partial data, and to generate merged data by combining the second data with the corrected second partial data; and
   a second ECC circuit configured to set the second partial data to binary values of 0, to generate third data by combining the second partial data set to the binary values of 0 with the second data, to generate a third parity for the third data, and to generate an internal parity for the merged data by using the third parity.

2. The ECC circuit of claim 1, wherein the first ECC circuit is configured to generate a syndrome that indicates an existence of one or more errors in the first partial data and the second partial data.

3. The ECC circuit of claim 2, wherein the first ECC circuit is configured to set the first partial data to the binary values of 0, to combine the first partial data set to the binary values of 0 with the corrected second partial data to generate combined data, and to generate a partial parity for the corrected second partial data by using the combined data.

4. The ECC circuit of claim 3, wherein the second ECC circuit is configured to generate the internal parity based on the syndrome, the partial parity, and the third parity.

5. The ECC circuit of claim 1, wherein the first ECC circuit and the second ECC circuit are configured to generate the merged data and the internal parity, respectively, in parallel.

6. The ECC circuit of claim 1, wherein the first ECC circuit comprises:
   a first parity generation circuit configured to generate a syndrome that indicates an existence of one or more errors in the first partial data and the second partial data and also to generate a partial parity for the corrected second partial data;
   a read data correction circuit configured to correct the one or more errors of the first partial data and the second partial data by decoding the syndrome and to generate the corrected second partial data; and
   a first merge circuit configured to generate the merged data by combining the second data with the corrected second partial data.

7. The ECC circuit of claim 6, wherein the second ECC circuit comprises:
   a second merge circuit configured to generate the third data by combining the second data with the second partial data set to the binary values of 0;
   a second parity generation circuit configured to generate the third parity for the third data; and
   a parity correction circuit configured to generate the internal parity based on the syndrome, the partial parity, and the third parity.

8. A memory device comprising:
   a memory cell array comprising a plurality of memory cells and configured to output first data stored in the memory cells according to a data mask option; and
   an error correction circuit configured to generate merged data and an internal parity for the merged data based on the first data and second data according to the data mask option,
   wherein the error correction circuit comprises:
   a first ECC circuit configured to receive the first data and the second data, the first data comprising first partial data and second partial data, to correct one or more errors in the second partial data to generate corrected second partial data, and to generate the merged data by combining the second data with the corrected second partial data; and
   a second ECC circuit configured to set the second partial data to binary values of 0, to generate third data by combining the second partial data set to the binary values of 0 with the second data, to generate a third parity for the third data, and to generate the internal parity for the merged data by using the third parity.

9. The memory device of claim 8, wherein the first ECC circuit is configured to generate a syndrome that indicates an existence of one or more errors in the first partial data and the second partial data.

10. The memory device of claim 9, wherein the first ECC circuit is configured to set the first partial data to the binary values of 0, to combine the first partial data set to the binary values of 0 with the corrected second partial data to generate combined data, and to generate a partial parity for the corrected second partial data by using the combined data.

11. The memory device of claim 10, wherein the second ECC circuit is configured to generate the internal parity based on the syndrome, the partial parity, and the third parity.

12. The memory device of claim 8, wherein the first ECC circuit and the second ECC circuit are configured to generate the merged data and the internal parity, respectively, in parallel.

13. The memory device of claim 8, wherein the first ECC circuit comprises:
a first parity generation circuit configured to generate a syndrome that indicates an existence of one or more errors in the first partial data and the second partial data and to generate a partial parity for the corrected second partial data;
a read data correction circuit configured to correct the one or more errors of the first partial data and the second partial data by decoding the syndrome and to generate the corrected second partial data; and
a first merge circuit configured to generate the merged data by combining the second data with the corrected second partial data.

14. The memory device of claim 13, wherein the second ECC circuit comprises:
a second merge circuit configured to generate the third data by combining the second data with the second partial data set to the binary values of 0;
a second parity generation circuit configured to generate the third parity for the third data; and
a parity correction circuit configured to generate the internal parity based on the syndrome, the partial parity, and the third parity.

15. The memory device of claim 8, wherein the memory cell array is configured to store the merged data and the internal parity in response to the data mask option.

16. A method of operating an error correction code (ECC) circuit, the method comprising:
(a) receiving first data and second data, wherein the first data comprises first partial data and second partial data output from a memory cell array;
(b) correcting one or more errors in the second partial data to generate corrected second partial data;
(c) generating merged data by combining the second data with the corrected second partial data;
(d) setting the second partial data to binary values of 0 and generating third data by combining the second partial data set to the binary values of 0 with the second data;
(e) generating a third parity for the third data; and
(f) generating an internal parity for the merged data by using the third parity.

17. The method of claim 16, wherein the generating the merged data and the generating the internal parity are performed in parallel, and wherein the merged data and the internal parity are output for storage in the memory cell array responsive to generation thereof in parallel.

18. The method of claim 17, further comprising generating a syndrome that indicates an existence of one or more errors in the first partial data and the second partial data.

19. The method of claim 18, further comprising:
setting the first partial data to the binary values of 0, combining the first partial data set to the binary values of 0 with the corrected second partial data to generate combined data, and generating a partial parity for the corrected second partial data by using the combined data.

20. The method of claim 19, wherein the generating the internal parity comprises generating the internal parity based on the syndrome, the partial parity, and the third parity.

* * * * *